United States Patent
Kobayashi et al.

(10) Patent No.: US 7,771,495 B2
(45) Date of Patent: Aug. 10, 2010

(54) PRODUCTION METHOD FOR ELECTRIC DOUBLE LAYER CAPACITOR

(75) Inventors: Kotaro Kobayashi, Tokyo (JP); Kazuhiro Minami, Tokyo (JP)

(73) Assignee: Japan Gore-Tex Inc., Tokyo (JP)

( * ) Notice: Subject to any disclaimer, the term of this patent is extended or adjusted under 35 U.S.C. 154(b) by 0 days.

(21) Appl. No.: 11/908,868

(22) PCT Filed: Mar. 17, 2006

(86) PCT No.: PCT/JP2006/305893

§ 371 (c)(1),
(2), (4) Date: Dec. 19, 2008

(87) PCT Pub. No.: WO2006/098518

PCT Pub. Date: Sep. 21, 2006

(65) Prior Publication Data

US 2009/0126172 A1      May 21, 2009

(30) Foreign Application Priority Data

Mar. 18, 2005    (JP) .............................. 2005-080463

(51) Int. Cl.
*H01G 9/155* (2006.01)
*H01G 7/00* (2006.01)

(52) U.S. Cl. ..................... 29/25.03; 29/25.41; 361/502
(58) Field of Classification Search ................. 361/502; 29/25.03, 25.41

See application file for complete search history.

(56) References Cited

U.S. PATENT DOCUMENTS

| | | | |
|---|---|---|---|
| 6,310,762 B1 | 10/2001 | Okamura et al. | 361/502 |
| 6,487,066 B1 | 11/2002 | Niiori et al. | 361/502 |
| 6,721,168 B2 | 4/2004 | Takeucki et al. | 361/502 |
| 6,738,252 B2 | 5/2004 | Okamura et al. | 361/502 |
| 6,882,517 B2 | 4/2005 | Tano et al. | 361/502 |
| 7,283,349 B2 * | 10/2007 | Yoshida et al. | 361/502 |
| 2002/0012223 A1 * | 1/2002 | Okamura et al. | 361/502 |
| 2002/0039275 A1 * | 4/2002 | Takeuchi et al. | 361/504 |
| 2002/0057549 A1 | 5/2002 | Oyama et al. | 361/303 |
| 2007/0201185 A1 * | 8/2007 | Yoshio et al. | 361/502 |
| 2008/0102371 A1 * | 5/2008 | Mitchell et al. | 429/231.8 |

FOREIGN PATENT DOCUMENTS

| | | |
|---|---|---|
| JP | 07-022295 | 6/1993 |
| JP | 2000-068164 A | 3/2000 |
| JP | 2000-068165 A | 3/2000 |
| JP | 2000-100668 A | 4/2000 |
| JP | 2003-86469 | 3/2003 |

* cited by examiner

*Primary Examiner*—Evan Pert
(74) *Attorney, Agent, or Firm*—Allan M. Wheatcraft

(57) ABSTRACT

A method for manufacturing an electric double layer capacitor comprising polarizable electrodes formed from a carbon material having graphite-like microcrystalline carbon, wherein said carbon material is stored for a predetermined period of time while holding said carbon material in contact with an electrolytic solution, and thereafter, at a temperature higher than room temperature, said capacitor is charged at least once with an end-of-charge voltage higher than an expected operating voltage of said capacitor, while applying to said electrodes, at the start of said charging, a pressure that is necessary to keep said carbon material from expanding in a thickness direction thereof during said charging.

7 Claims, No Drawings

PRODUCTION METHOD FOR ELECTRIC DOUBLE LAYER CAPACITOR

TECHNICAL FIELD

The present invention relates to a method for manufacturing an electric double layer capacitor.

BACKGROUND ART

In recent years, electric double layer capacitors capable of charging and discharging with a large current have been attracting attention as a type of electric power storage device for applications requiring frequent charge/discharge cycles, for example, auxiliary power supplies for electric vehicles, solar cells, wind power generation, etc. There is therefore a need for an electric double layer capacitor that has high energy density, is capable of fast charging and discharging, and has excellent durability.

An electric double layer capacitor comprises a pair of polarizable electrodes as a positive electrode and a negative electrode disposed opposite each other with a separator interposed therebetween. Each polarizable electrode is impregnated with an aqueous or non-aqueous electrolytic solution, and is combined with a current collector.

A carbon material having a graphite-like microcrystalline carbon is known for use as a polarizable electrode material for electric double layer capacitors (Japanese Unexamined Patent Publication No. H11-317333). This carbon material is prepared by controlling the activation process of the raw material so that the distance between the layers of the crystallites of the graphite-like microcrystalline carbon lies within a range of 0.350 to 0.385 nm. A microcrystalline carbon having this specific interlayer distance exhibits the property that when the usual expected operating voltage (rated voltage) is applied while holding the carbon in contact with an electrolytic solution, only a small capacitance can be obtained because of its small specific surface area, but once a voltage higher than the expected operating voltage is applied, electrolyte activation occurs with electrolyte ions inserted between the layers, thus producing a high capacitance. Once the ions are inserted, the carbon material maintains high-capacitance even when it is repeatedly used with the expected operating voltage. Compared with activated carbon commonly used as a carbon material for electric double layer capacitors, the above carbon material has a high withstand voltage and permits energy density to be increased significantly, and therefore has been attracting attention as a carbon material that can replace activated carbon.

When performing initial charging to complete the electric double layer capacitor whose polarizable electrodes are formed from the carbon material having graphite-like microcrystalline carbon, it is known to use a voltage higher than the expected operating voltage in order to forcefully insert electrolyte ions between the layers of the microcrystalline carbon (Japanese Unexamined Patent Publication No. 2000-077273). It is also known that, during the initial charging of the electric double layer capacitor, a pressure that resists the expansion of the polarizable electrodes due to the insertion of the electrolyte ions is applied to the polarizable electrodes in order to suppress the expansion of the polarizable electrodes (Japanese Unexamined Patent Publication Nos. 2000-068164 and 2000-068165). Furthermore, it is known that, when performing such initial charging, the electric double layer capacitor is charged for a time longer than the rated charge time of the electric double layer capacitor (Japanese Unexamined Patent Publication No. 2000-100668). Any of these prior art techniques is intended to improve the method of initial charging in order to increase the capacitance of the electric double layer capacitor. However, no prior art technique is known that focuses on the processing of the polarizable electrodes before charging or the temperature during the charging.

DISCLOSURE OF THE INVENTION

It is an object of the present invention to provide a method for manufacturing an electric double layer capacitor that achieves a high capacitance density compared with the prior art.

According to the present invention, there is provided (1) a method for manufacturing an electric double layer capacitor comprising polarizable electrodes formed from a carbon material having graphite-like microcrystalline carbon, wherein the carbon material is stored for a predetermined period of time while holding the carbon material in contact with an electrolytic solution, and thereafter, at a temperature higher than room temperature, the capacitor is charged at least once with an end-of-charge voltage higher than an expected operating voltage of the capacitor, while applying to the electrodes, at the start of the charging, a pressure that is necessary to keep the carbon material from expanding in a thickness direction thereof during the charging.

According to the present invention, there is also provided (2) a method as described in item (1), wherein the carbon material is stored at a temperature higher than room temperature.

According to the present invention, there is also provided (3) a method as described in item (1) or (2), wherein the temperature during the storage and the temperature during the charging are both maintained at 35° C. or higher.

According to the present invention, there is also provided (4) a method as described in any one of items (1) to (3), wherein the carbon material is stored for 12 hours or longer.

According to the present invention, there is also provided (5) a method as described in any one of items (1) to (4), wherein the pressure is within a range of $4.9 \times 10^5$ to $4.9 \times 10^6$ Pa.

According to the present invention, there is also provided (6) a method as described in any one of items (1) to (5), wherein the end-of-charge voltage is within a range of 110 to 135% of the expected operating voltage.

According to the present invention, there is also provided (7) a method as described in any one of items (1) to (6), wherein the carbon material having graphite-like microcrystalline carbon has a specific surface area not larger than 200 $m^2/g$ as measured by a BET single-point method before the charging, and an interlayer distance $d_{002}$ lying within a range of 0.350 to 0.385 nm as measured by an X-ray diffraction method.

BEST MODE FOR CARRYING OUT THE INVENTION

A method for manufacturing an electric double layer capacitor according to the present invention is characterized in that a carbon material having graphite-like microcrystalline carbon (hereinafter referred to as "graphite-like carbon material") is stored for a predetermined period of time while holding the carbon material in contact with an electrolytic solution, and thereafter, at a temperature higher than room temperature, the capacitor is charged at least once with an end-of-charge voltage higher than the expected operating voltage of the capacitor, while applying to the electrodes, at the start of the charging, a pressure that is necessary to keep the carbon material from expanding in its thickness direction during the charging.

The graphite-like carbon material used in the manufacturing method of the electric double layer capacitor according to the present invention has microcrystalline carbon. Generally, the above carbon material is not suitable for use as an electrode material for electric double layer capacitors because its specific surface area is small. However, when the distance $d_{002}$ between the layers of the microcrystalline carbon (measured by an X-ray diffraction method) lies within a specific range, i.e., the range of 0.350 to 0.385 nm, this graphite-like carbon material exhibits a high capacitance as a polarizable electrode despite its small specific surface area. More preferably, the interlayer distance $d_{002}$ is in the range of 0.360 to 0.380 nm, because then the expression of capacitance due to the interlayer insertion of electrolyte ions becomes more pronounced. If the interlayer distance $d_{002}$ is smaller than 0.350 nm, the interlayer insertion of electrolyte ions becomes difficult to occur, and the capacitance therefore decreases. Conversely, if the interlayer distance $d_{002}$ is larger than 0.385 nm, the interlayer insertion of electrolyte ions likewise becomes difficult to occur, and the capacitance decreases, which is not desirable.

The specific surface area of this graphite-like carbon material is preferably 200 $m^2/g$ or less, more preferably 100 $m^2/g$ or less, and particularly preferably 20 $m^2/g$ or less. If the specific surface area is larger than 200 $m^2/g$, a sufficient capacitance density can be obtained without relying on the method of the present invention. However, the amount of functional groups existing on the surface of the graphite-like carbon material increases, and when a voltage is applied, these functional groups decompose, significantly degrading the performance of the electric double layer capacitor. The values of the specific surface area given here were obtained by a BET single-point method (drying temperature: 180° C., drying time: 1 hour) by using MONOSORB manufactured by Yuasa Ionics Co., Ltd.

A low-temperature calcined carbon material that is not well activated can be used as the graphite-like carbon material, and can be produced using various kinds of materials such as wood, fruit shells, coal, pitch, coke, etc., that are commonly used as materials for activated carbon. For example, the material can be produced by heat treating it in an inert atmosphere before activation thereby preventing activation from proceeding substantially, or by activating it only briefly. As for the heat treatment, it is preferable to calcine the material at relatively low temperatures of about 600 to 1000° C. For other graphite-like carbon materials advantageous for use in the present invention and the production methods thereof, refer to Japanese Unexamined Patent Publication Nos. H11-317333, 2000-077273, 2000-068164, 2000-068165, and 2000-100668. The graphite-like carbon material is contained in each polarizable electrode in an amount ranging from 50% to 99% by mass, or more preferably from 65% to 85% by mass, with respect to the combined mass of the graphite-like carbon material and the binder and conductive agent described hereinafter. If the content of the graphite-like carbon material is smaller than 50% by mass, the energy density of the electrode decreases. Conversely, if the content exceeds 99% by mass, the amount of the binder becomes insufficient, resulting in an inability to form a continuous sheet-like electrode.

The electrode for the electric double layer capacitor contains a conductive agent for conferring electrical conductivity to the graphite-like carbon material. Carbon black such as Ketjen black or acetylene black, nanocarbon such as fullerene, carbon nanotube, or carbon nanohorn, or powdered graphite or the like can be used as the conductive agent. The conductive agent should be added preferably in an amount ranging from 1% to 40% by mass, or more preferably in an amount ranging from 3% to 20% by mass, with respect to the combined mass of the conductive agent, the graphite-like carbon material, and the binder. If the amount of the conductive agent added is smaller than 1% by mass, the internal resistance of the electric double layer capacitor increases. Conversely, if the amount added exceeds 40% by mass, the energy density of the electrode decreases.

The electrode for the electric double layer capacitor contains a binder for binding the conductive agent to the graphite-like carbon material to form a sheet-like structure. A known material such as polytetrafluoroethylene (PTFE), polyvinylidene fluoride (PVDF), polyethylene (PE), polypropylene (PP), styrene-butadiene rubber (SBR), acrylonitrile-butadiene rubber (NBR), etc., can be used as the binder. The binder should be added preferably in an amount ranging from 1% to 30% by mass, or more preferably in an amount ranging from 3% to 20% by mass, with respect to the combined mass of the binder, the graphite-like carbon material, and the conductive agent. If the amount of the binder added is smaller than 1% by mass, a continuous sheet-like electrode cannot be formed. Conversely, if the amount added exceeds 30% by mass, the internal resistance of the electric double layer capacitor increases.

The electrode for the electric double layer capacitor here can be manufactured by a method similar to the conventional method that uses activated carbon. For example, after the particle size of the graphite-like carbon material prepared by the earlier described method has been adjusted so that the mean particle size D50 falls within the range of about 5 to 200 μm, the conductive agent and the binder are added to the carbon material, and the mixture is kneaded and rolled into a sheet-like form. When kneading, various liquid agents such as water, ethanol, acetonitrile, siloxane, etc. may be used singly or mixed together in a suitable combination. The electrode thickness of the electric double layer capacitor is preferably 50 to 500 μm, and more preferably 60 to 300 μm. If the thickness is smaller than 50 μm, pinholes are likely to be formed in the electrode. Conversely, if the thickness exceeds 500 μm, the density of the electrode cannot be increased, and as a result, the energy density of the electrode decreases. The values of the electrode thickness given here were obtained by measuring it using a dial thickness gauge "SM-528" manufactured by Teclock Co., Ltd., without applying any load other than the instrument's spring load.

By combining the thus produced sheet-like electrodes with a suitable separator and current collectors commonly used in an electric double layer capacitor, and by impregnating the electrodes with a suitable electrolytic solution, the electric double layer capacitor according to the present invention can be fabricated. Various kinds of sheet materials, including a metallic sheet of aluminum, titanium, stainless steel, or the like, and a non-metallic sheet such as a conductive polymer film, a conductive-filler-containing plastic film, or the like, can be used for the current collectors. The sheet-like current collectors may each be formed so as to contain pores in a portion thereof or over the entire surface thereof. The sheet-like electrode and the sheet-like current collector can function as the electrode and current collector by simply pressure-bonding one to the other. However, in order to reduce the contact resistance between them, they may be bonded together by using a conductive paint as a bonding material, or by applying a conductive paint over the electrode or the current collector and pressure-bonding them after drying. An insulating material, such as microporous paper or glass or a porous plastic film of polyethylene, polypropylene, polytetrafluoroethylene, or the like, can be used for the separator. The separator thickness is generally in the range of about 10 to 100 μm. A liquid electrolyte or an electrolytic solution prepared by dissolving an electrolyte in an organic solvent may be used as the electrolytic solution. A person skilled in the art can select a suitable one according to the purpose.

According to the present invention, prior to the initial charging of the thus fabricated electric double layer capacitor, the graphite-like carbon material is stored for a predetermined period of time while holding the carbon material in contact with the electrolytic solution. By providing the storing step before the initial charging step, the electrolytic solution can be made to sufficiently penetrate into the pores of the graphite-like carbon material before the charging, compared with the case where such a storing step is not provided, as a result, the capacitance per unit volume (capacitance density) of the resulting electric double layer capacitor significantly increases.

The carbon material may be stored at room temperature, or in other words about 25° C. Preferably, the material should be stored at a temperature higher than room temperature, for example, at 35° C. or higher. When the storage temperature is 35° C. or higher, the viscosity of the electrolytic solution decreases, making it easier for the electrolytic solution to penetrate into the pores of the graphite-like carbon material before the charging. Conversely, when the storage temperature is lower than room temperature, the viscosity of the electrolytic solution increases, making it difficult for the electrolytic solution to penetrate into the pores, therefore, it is preferable to store the material at a temperature not lower than 20° C. There is no specific upper limit to the storage temperature, but it is preferable to store the material at a temperature that does not cause the electrolytic solution to decompose. For example, when a propylene carbonate solution of triethylmethylammonium tetrafluoroborate is used as the electrolytic solution, the storage temperature should be held lower than 80° C. because the electrolytic solution decomposes at temperatures of 80° C. or higher.

The storage time differs depending on the storage temperature, the temperature during charging, and other process parameters, but when storing the material at room temperature, the storage time is generally 12 hours or longer, preferably 18 hours or longer, or more preferably 24 hours or longer. When storing the material at room temperature, if the storage time is shorter than 12 hours, the electrolytic solution cannot sufficiently penetrate into the pores of the graphite-like carbon material before charging. On the other hand, when storing the material at a temperature higher than room temperature, even if the storage time is significantly shorter than 12 hours, the intended effect of the present invention may be achieved. There is no specific upper limit to the storage time, but if the material is stored for an extended period of time, a further increase in the capacitance density cannot be expected and the manufacturing efficiency of the electric double layer capacitor drops.

According to the present invention, after the storing step, the capacitor is charged while applying to the electrodes, at the start of the charging, a pressure that is necessary to keep the graphite-like carbon material from expanding in its thickness direction during the charging. The graphite-like carbon material has the characteristic that when it is used as an electrode material for an electric double layer capacitor, it exhibits a high capacitance, but expands when a voltage is applied (for charging). In other words, when the electric double layer capacitor is fabricated by forming the graphite-like carbon material in a sheet-like shape and laminating it to one or both sides of the current collector, and a voltage is applied between the current collectors, the graphite-like carbon material expands predominantly in the voltage application direction due to the current collectors. Since the volume of the electric double layer capacitor increases as the graphite-like carbon material used for the electrodes expands, the capacitance per unit volume (capacitance density) of the electric double layer capacitor decreases correspondingly even if the capacitance of the electric double layer capacitor increases. Accordingly, if the increase of the capacitance is to provide a practical benefit, it is preferable to minimize the increase of the volume of the electric double layer capacitor due to the expansion of the graphite-like carbon material. Therefore, a pressure that resists the pressure (expansion pressure) produced by the expansion of the graphite-like carbon material is applied externally to the electrodes in order to suppress the increase in the volume of the electric double layer capacitor. For example, by externally applying a pressure of about $4.9 \times 10^5$ to $4.9 \times 10^6$ Pa to the electrodes during the charging, the capacitance can be effectively increased. Here, if the expansion of the electrode volume is completely suppressed, the capacitance produced between the electrodes is almost the same as when a free expansion is permitted.

According to the present invention, by charging the capacitor at a temperature higher than room temperature, the capacitance density of the resulting electric double layer capacitor significantly increases. The capacitor is charged preferably at 35° C. or higher, or more preferably at 40° C. or higher. If the temperature during the charging is lower than room temperature, the viscosity of the electrolytic solution increases, making it difficult for the electrolytic solution to penetrate into the pores that are newly formed in the graphite-like carbon material by the activation of the electrolyte during the charging. There is no specific upper limit to the temperature during the charging, but as in the case of storage, it is preferable to charge the capacitor at a temperature that does not cause the electrolytic solution to decompose.

The charging is done with an end-of-charge voltage higher than the expected operating voltage of the electric double layer capacitor. The electrolyte ions (together with the solvent in the case of an organic solvent) are thus inserted between the layers of the graphite-like carbon material, and thereafter, an electric double layer is formed. It is preferable to set the end-of-charge voltage within the range of 110% to 135% of the expected operating voltage. If the end-of-charge voltage is lower than 110% of the expected operating voltage, a high capacitance density cannot be achieved because the electrical activation is insufficient. If it exceeds 135%, the decomposition of the electrolytic solution is promoted, and as a result, the performance of the electric double layer capacitor significantly drops.

EXAMPLES

Examples of the present invention will be described in detail below.

Example 1

A pitch-based carbon precursor was calcined at 800° C. in an inert atmosphere to carbonize it, and potassium hydroxide whose weight ratio to the carbonized material was 2 was mixed with it. Then, the mixture was activated through heat treatment at 700° C. in an inert atmosphere, to produce a graphite-like carbon material having a BET specific surface area of 10 m$^2$/g. When this graphite-like carbon material was analyzed by X-ray diffraction, the distance $d_{002}$ between the layers of the microcrystalline carbon was 0.360 nm. Ethanol was added to a mixture consisting of 80% by mass of the graphite-like carbon material, 10% by mass of Ketjen black powder as a conductive agent ("EC600JD" manufactured by Ketjen Black International Co., Ltd), and 10% by mass of polytetrafluoroethylene powder as a binder ("TEFLON (registered trademark) 6J" manufactured by Mitsui DuPont Fluorochemicals Co., Ltd.), and the resulting mixture was kneaded and then rolled three times to produce a polarizable sheet of a width of 100 mm and a thickness of 200 μm. A highly pure etched aluminum foil of a width of 150 mm and a thickness of 50 μm ("C512" manufactured by KDK Corporation) was used as a current collector, and a conductive adhesive liquid ("GA-37" manufactured by Hitachi Powdered Metals Co., Ltd.) was applied in an amount of 30 g/m² on both sides of the current collector by using a coating roller. In terms of dry mass, the amount of the applied liquid was 6 g/m². After the application of the liquid, a long length of the polarizable sheet was placed over each of the liquid-applied portions (on both sides) of the current collector, and the sheet and the current collector were bonded together by passing them through compression rolls, thus obtaining a laminated sheet with the contacting faces reliably bonded together. Then, the laminated sheet was passed through a continuous hot air drying machine whose temperature was set to 150° C., and the dispersion medium was removed by evaporation from the conductive adhesive liquid layers, thereby obtaining a long polarizable electrode. The laminated sheet was passed through the drying machine at such a speed that every portion of the laminated sheet stayed within the drying machine for three minutes.

This long laminated sheet was press cut to form a rectangular-shaped polarizable electrode with its carbon electrode portion measuring 10 cm square and its lead portion (the portion where the current collector is not covered with the polarizable electrode) measuring 2×10 cm. Two such polarizable electrodes were set up as a positive electrode and a negative electrode, respectively, and a 80-μm thick hydrophilized ePTFE sheet ("BSP0708070-2" manufactured by Japan Gore-Tex Inc.) was inserted as a separator between them to produce a single cell. Next, the single cell was vacuum dried at 230° C. for 24 hours, after which the cell was wrapped in an aluminum pack inside a glove box where a dew point of −60° C. or less was maintained in an argon atmosphere. The aluminum pack used was made by cutting a dry laminated product "PET12/A120/PET12/CPP30" manufactured by Showa Denko Packaging Co., Ltd. and formed into a 25×20-cm bag-like shape by heat sealing (one of the shorter sides was left open, and the other three sides were heat sealed). To impregnate the electrodes with an electrolytic solution, a propylene carbonate solution containing 1.8 mol/L of triethylmethylammonium tetrafluoroborate was injected as the electrolytic solution into the aluminum pack at a reduced pressure of −0.05 MPa, and the electrodes were left immersed in the solution for 10 minutes. Finally, the open end of the aluminum pack was sealed by heating, thus producing a rectangular-shaped electric double layer capacitor. The expected operating voltage of this capacitor was 3.3 V.

The rectangular-shaped electric double layer capacitor was stored at 25° C. for 24 hours. Then, a compression pressure (surface compression pressure) of 2.45×10⁶ Pa was applied from both sides of the capacitor and, in this condition, initial charging was performed by charging the capacitor up to 4.0 V at a current density of 5 mA/cm² in a thermostatic chamber maintained at 40° C., and thereafter, the capacitor was discharged to 0 V with the same current density. This capacitor is designated as the capacitor of Example 1.

Examples 2 to 5

Each capacitor was produced in the same manner as in Example 1, except that the storage temperature was set to 40° C., 50° C., 60° C., and 70° C., respectively.

Example 6

A capacitor was produced in the same manner as in Example 1, except that the storage time was set to 12 hours.

Examples 7 to 9

Each capacitor was produced in the same manner as in Example 1, except that the surface compression pressure was set to 4.9×10⁵ Pa, 1.5×10⁶ Pa, and 4.9×10⁶ Pa, respectively.

Examples 10 to 12

Each capacitor was produced in the same manner as in Example 1, except that the temperature of the thermostatic chamber during the charging was maintained at 50° C., 60° C., and 70° C., respectively.

Examples 13 to 15

Each capacitor was produced in the same manner as in Example 1, except that the end-of-charge voltage was set to 3.7 V, 4.1 V, and 4.3 V, respectively.

Comparative Example 1

A capacitor was produced in the same manner as in Example 1, except that the rectangular-shaped electric double layer capacitor was subjected to initial charging immediately after the production by omitting the storing step.

Comparative Examples 2 and 3

Each capacitor was produced in the same manner as in Example 1, except that the storage time was set to 5 hours and 10 hours, respectively.

Comparative Example 4

A capacitor was produced in the same manner as in Example 1, except that the temperature of the thermostatic chamber during the charging was maintained at room temperature (25° C.).

Comparative Example 5

A capacitor was produced in the same manner as in Example 1, except that the surface compression pressure was set to 9.8×10⁴ Pa.

Comparative Example 6

A capacitor was produced in the same manner as in Example 1, except that the end-of-charge voltage was set to 4.5 V.

The manufacturing conditions for the respective capacitors are summarized in Table 1 below.

TABLE 1

| | Storage temperature (° C.) | Storage time (h) | Surface compression pressure (Pa) | Temperature during charging (° C.) | End-of-charge voltage (V) | End-of-charge voltage (%) |
|---|---|---|---|---|---|---|
| Example 1 | 25 | 24 | $2.5 \times 10^6$ | 40 | 4.0 | 121 |
| Example 2 | 40 | 24 | $2.5 \times 10^6$ | 40 | 4.0 | 121 |
| Example 3 | 50 | 24 | $2.5 \times 10^6$ | 40 | 4.0 | 121 |
| Example 4 | 60 | 24 | $2.5 \times 10^6$ | 40 | 4.0 | 121 |
| Example 5 | 70 | 24 | $2.5 \times 10^6$ | 40 | 4.0 | 121 |
| Example 6 | 25 | 12 | $2.5 \times 10^6$ | 40 | 4.0 | 121 |
| Example 7 | 40 | 24 | $4.9 \times 10^5$ | 40 | 4.0 | 121 |
| Example 8 | 40 | 24 | $1.5 \times 10^6$ | 40 | 4.0 | 121 |
| Example 9 | 40 | 24 | $4.9 \times 10^6$ | 40 | 4.0 | 121 |
| Example 10 | 40 | 24 | $2.5 \times 10^6$ | 50 | 4.0 | 121 |
| Example 11 | 40 | 24 | $2.5 \times 10^6$ | 60 | 4.0 | 121 |
| Example 12 | 40 | 24 | $2.5 \times 10^6$ | 70 | 4.0 | 121 |
| Example 13 | 40 | 24 | $2.5 \times 10^6$ | 40 | 3.7 | 112 |
| Example 14 | 40 | 24 | $2.5 \times 10^6$ | 40 | 4.1 | 124 |
| Example 15 | 40 | 24 | $2.5 \times 10^6$ | 40 | 4.3 | 130 |
| Comparative example 1 | — | 0 | $2.5 \times 10^6$ | 40 | 4.0 | 121 |
| Comparative example 2 | 25 | 5 | $2.5 \times 10^6$ | 40 | 4.0 | 121 |
| Comparative example 3 | 25 | 10 | $2.5 \times 10^6$ | 40 | 4.0 | 121 |
| Comparative example 4 | 25 | 24 | $2.5 \times 10^6$ | 25 | 4.0 | 121 |
| Comparative example 5 | 40 | 24 | $9.8 \times 10^4$ | 40 | 4.0 | 121 |
| Comparative example 6 | 25 | 24 | $2.5 \times 10^6$ | 40 | 4.5 | 136 |

Expansion ratio, volumetric capacitance density, and internal resistance were measured on each of the electric double layer capacitors of Examples 1 to 15 and Comparative examples 1 to 6. The measurement conditions were as shown below.

(Expansion Ratio)

The expansion ratio was calculated by measuring the thickness of the electrode portion after the fifth cycle of charging performed under the charge/discharge conditions given hereinafter (the thickness was measured after removing the surface compression pressure) and by dividing the thus measured thickness by its initial thickness of 200 μm.

(Volumetric Capacitance Density)

Measuring instrument: "CDT510-4" manufactured by Power Systems Co., Ltd.

Charging: 5 mA/cm², 3.3 V, 3600 seconds

Discharging: 5 mA/cm², 0 V

The capacitance at the end of the fifth cycle was obtained by an energy conversion method, and the volumetric capacitance density was calculated by dividing the obtained value by the volume of the positive and negative carbon electrode portions, excluding the current collectors, before and after the expansion. For the calculation, analysis software ("CDT Utility" produced by Power Systems Co., Ltd.) was used.

(DC Internal Resistance)

When measuring the volumetric capacitance density, the internal resistance was calculated by the equation V=IR. For the calculation, analysis software ("CDT Utility" produced by Power Systems Co., Ltd.) was used.

TABLE 2

| | Expansion ratio (%) | Volumetric capacitance density (F/cm³) | | Internal resistance (mΩ) |
|---|---|---|---|---|
| | | Before expansion | After expansion | |
| Example 1 | 130 | 40 | 31 | 11 |
| Example 2 | 110 | 40 | 36 | 10 |
| Example 3 | 115 | 40 | 35 | 10 |
| Example 4 | 115 | 40 | 35 | 9 |
| Example 5 | 115 | 40 | 35 | 9 |
| Example 6 | 140 | 40 | 29 | 12 |
| Example 7 | 130 | 42 | 32 | 12 |
| Example 8 | 120 | 40 | 33 | 11 |
| Example 9 | 100 | 36 | 36 | 13 |
| Example 10 | 115 | 40 | 35 | 11 |
| Example 11 | 115 | 40 | 35 | 11 |
| Example 12 | 120 | 38 | 32 | 11 |
| Example 13 | 105 | 33 | 32 | 10 |
| Example 14 | 125 | 42 | 34 | 11 |
| Example 15 | 135 | 45 | 33 | 12 |
| Comparative example 1 | 200 | 40 | 20 | 15 |
| Comparative example 2 | 180 | 38 | 21 | 15 |
| Comparative example 3 | 180 | 40 | 22 | 15 |
| Comparative example 4 | 190 | 40 | 21 | 15 |
| Comparative example 5 | 200 | 40 | 20 | 15 |
| Comparative example 6 | 300 | 45 | 15 | 20 |

As can be seen from Table 2, in the capacitor of each example according to the present invention, the expansion ratio was suppressed compared with the capacitor of any comparative example, and as a result, the volumetric capacitance density significantly increased. Comparing Example 1 and comparative example 1, it can be seen that when the rectangular-shaped electric double layer capacitor was stored for 24 hours, the volumetric capacitance density increased by at least 50%. In particular, a comparison between Example 6 and comparative examples 2 and 3 shows that when the capacitor was stored at room temperature (25° C.), if the storage time was not longer than 10 hours in other words, the period of time that could elapse from the moment that the electrolytic solution was injected until the start of the charging process, even when the capacitor was not specifically intended to be stored, the capacitance density increased by only 10% compared with the case where the storing step was omitted (comparative example 1), but that when the capacitor was stored for 12 hours, the capacitance density increased substantially (45%) compared with the case where the storing step was omitted. A comparison between Example 1 and comparative example 4 shows that when the temperature during the initial charging was maintained at a temperature (40° C.) higher than room temperature (25° C.), the capacitance density increased by about 50%. Further, a comparison between Example 2 and comparative example 5 shows that when the pressure necessary to suppress the expansion during the initial charging was applied to the electrodes at the start of the charging, and when the capacitor was charged in this condition, the capacitance density increased by at least 80%. The comparative example 6 shows that since the end-of-charge voltage was too high (it exceeded 135% of the expected operating voltage of 3.3 V), the surface compression pressure was unable to resist the expansion pressure. On the other hand, from a comparison between Example 1 and Examples 2 to 5, it can be seen that when the capacitor was stored at a temperature (40 to 70° C.) higher than room temperature (25° C.), the expansion due to the charging was further suppressed, and the capacitance density further increased.

INDUSTRIAL APPLICABILITY

According to the present invention, polarizable electrodes containing specifically a carbon material having graphite-like microcrystalline carbon are first stored for a predetermined period of time prior to initial charging, and then the charging is performed at a temperature higher than room temperature. Since this serves to suppress the expansion of the electrodes, the capacitance density of the electric double layer capacitor constructed using these polarizable electrodes significantly increases.

What is claimed is:

1. A method for manufacturing an electric double layer capacitor comprising polarizable electrodes formed from a carbon material having graphite-like microcrystalline carbon, wherein said carbon material is stored for a predetermined period of time while holding said carbon material in contact with an electrolytic solution, and thereafter, at a temperature higher than 25° C., said capacitor is charged at least once with an end-of-charge voltage higher than an expected operating voltage of said capacitor, while applying to said electrodes, at the start of said charging, a pressure that is necessary to keep said carbon material from expanding in a thickness direction thereof during said charging.

2. A method as claimed in claim 1, wherein said carbon material is stored at a temperature higher than 25° C.

3. A method as claimed in claim 1, wherein the temperature during said storage and the temperature during said charging are both maintained at 35° C. or higher.

4. A method as claimed in claim 1, wherein said carbon material is stored for 12 hours or longer.

5. A method as claimed in claim 1, wherein said pressure is within a range of $4.9 \times 10^5$ to $4.9 \times 10^6$ Pa.

6. A method as claimed in claim 1, wherein said end-of-charge voltage is within a range of 110 to 135% of said expected operating voltage.

7. A method as claimed in claim 1, wherein said carbon material having graphite-like microcrystalline carbon has a specific surface area not larger than 200 $m^2$/g as measured by a BET single-point method before said charging, and an interlayer distance $d_{002}$ lying within a range of 0.350 to 0.385 nm as measured by an X-ray diffraction method.

* * * * *